(12) United States Patent
Rezkallah

(10) Patent No.: US 8,864,872 B2
(45) Date of Patent: Oct. 21, 2014

(54) METHOD FOR THE RECOVERY OF URANIUM FROM PREGNANT LIQUOR SOLUTIONS

(75) Inventor: Areski Rezkallah, Lezennes (FR)

(73) Assignee: Rohm and Haas Company, Philadelphia, PA (US)

( * ) Notice: Subject to any disclaimer, the term of this patent is extended or adjusted under 35 U.S.C. 154(b) by 325 days.

(21) Appl. No.: 13/302,232

(22) Filed: Nov. 22, 2011

(65) Prior Publication Data
US 2012/0125158 A1 May 24, 2012

(30) Foreign Application Priority Data
Nov. 24, 2010 (EP) .................................... 10290625

(51) Int. Cl.
| | | |
|---|---|---|
| *B01D 15/04* | (2006.01) | |
| *B01J 47/00* | (2006.01) | |
| *C22B 60/02* | (2006.01) | |
| *C22B 3/38* | (2006.01) | |

(52) U.S. Cl.
CPC ........... *C22B 60/0234* (2013.01); *C22B 3/0067* (2013.01); *C22B 60/0265* (2013.01)
USPC .............. 75/398; 210/670; 210/679; 210/682

(58) Field of Classification Search
CPC .... C22B 60/0265; C22B 3/42; C22B 3/0098; B01D 15/185; B01D 15/361; B01D 15/362; B01D 15/363; C02F 1/42; C02F 2101/006; C02F 2001/422
USPC ........... 423/6, 7, 253, DIG. 14; 210/660, 682; 75/710, 398, 743
See application file for complete search history.

(56) References Cited

U.S. PATENT DOCUMENTS
| | | | | |
|---|---|---|---|---|
| 4,599,221 A | | 7/1986 | Ketzinel et al. | |
| 6,165,367 A | * | 12/2000 | Partridge | 210/670 |

FOREIGN PATENT DOCUMENTS
| | | |
|---|---|---|
| JP | 58181730 | 10/1983 |
| WO | 2012109705 | 8/2012 |

OTHER PUBLICATIONS

V. N. Rychkov; Uranium Sorption from Sulfate Solutions with Polyampholytes; Radiochemistry, vol. 45, No. 1,2003, pp. 56-60.
Robert C. Merritt;The Extractive Metallurgy of Uranium; Colorado School of Mines Research Institute; First printing—Library of Congress Catalog Card No. 71-157076, p. 147-153 only.
Wilson, et al., "What are the Options for an Integrated IX Process to Recover Uranium from Saline and Hypersaline Liquors" Proceedings of the ALTA Uranium Conference, May 26-27, 2011, ALTA Metallurgical Services, Australia.

* cited by examiner

*Primary Examiner* — Kaj K Olsen
*Assistant Examiner* — Jared Wood
(74) *Attorney, Agent, or Firm* — Carl P. Hemenway

(57) ABSTRACT

A method for the recovery of uranium from pregnant liquor solutions that comprise levels of chloride of 5 to 80 g/L by using an amino phosphonic functionalized resin. The method includes providing an amino phosphonic functionalized resin; providing a pregnant liquor solution comprising and uranium; passining the pregnant liquor solution over the amino phosphonic functionalized resin to separate the uranium from the pregnant liquor solution; and eluting the uranium.

5 Claims, 2 Drawing Sheets

METHOD FOR THE RECOVERY OF URANIUM FROM PREGNANT LIQUOR SOLUTIONS

Figure 1:
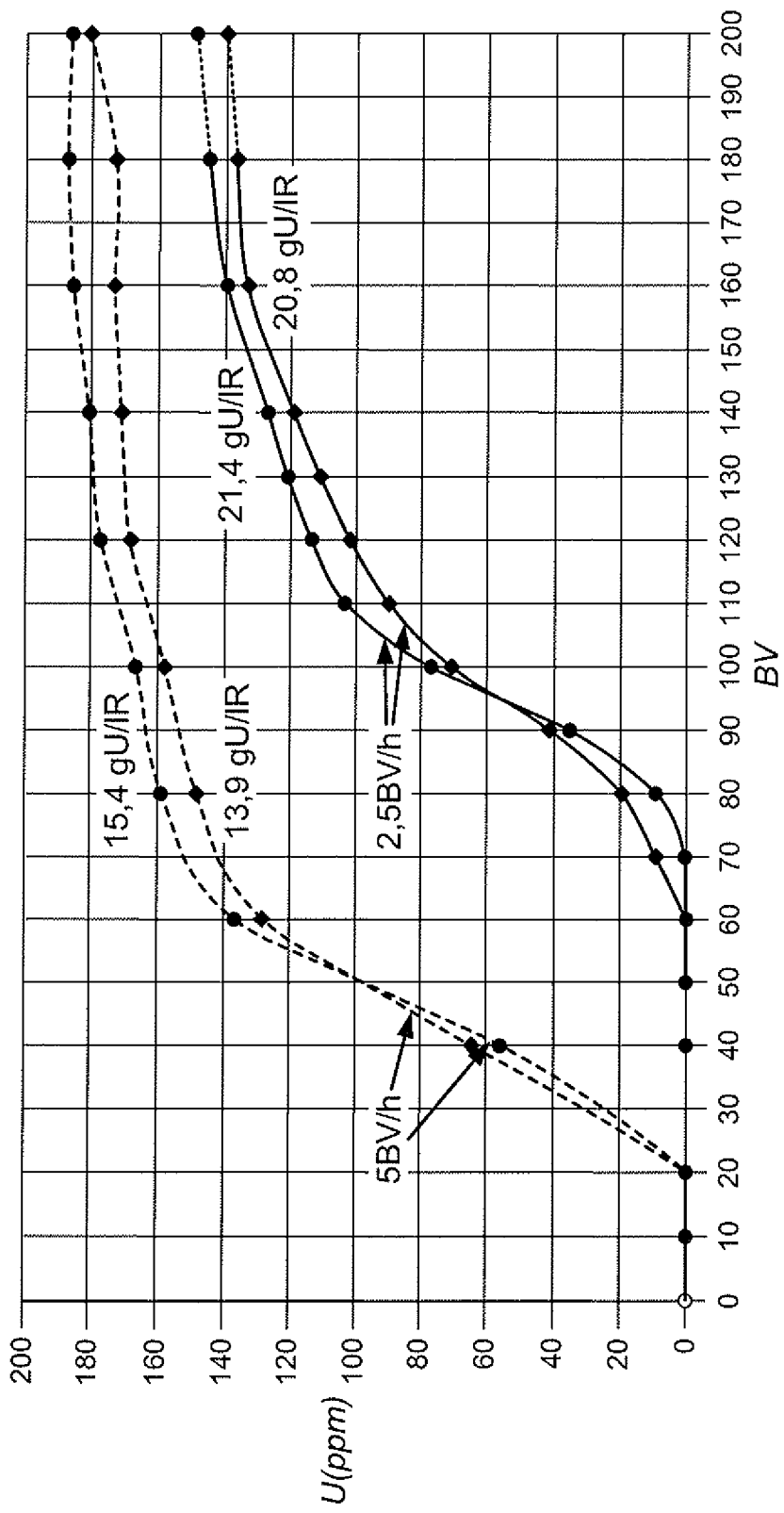

The present invention is directed to a new more environmentally friendly method for the recovery of uranium from acid leach pregnant liquor solutions that comprise high levels of chloride by using an amino phosphonic functionalized resin.

Numerous minerals are present in subsurface earth formations in very small quantities which make their recovery extremely difficult. However, in most instances, these minerals are also extremely valuable, thereby justifying efforts to recover the same. An example of one such mineral is uranium. However, numerous other valuable minerals, such as copper, nickel, molybdenum, rhenium, silver, selenium, vanadium, thorium, gold, rare earth metals, etc., are also present in small quantities in some subsurface formations, alone and quite often associated with uranium. Consequently, the recovery of such minerals is fraught with essentially the same problems as the recovery of uranium and, in general, the same techniques for recovering uranium can also be utilized to recover such other mineral values, whether associated with uranium or occurring alone. Therefore, a discussion of the recovery of uranium will be appropriate for all such minerals.

Uranium occurs in a wide variety of subterranean strata such as granites and granitic deposits, pegmatites and pegmatite dikes and veins, and sedimentary strata such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered.

There are several known techniques for extracting uranium values from uranium-containing materials. One common technique is roasting of the ore, usually in the presence of a combustion supporting gas, such as air or oxygen, and recovering the uranium from the resultant ash. However, the present invention is directed to the extraction of uranium values by the utilization of aqueous leaching solutions. There are two common leaching techniques (or lixiviation techniques) for recovering uranium values, which depend primarily upon the accessibility and size of the subterranean deposit. To the extent that the deposit containing the uranium is accessible by conventional mining means and is of sufficient size to economically justify conventional mining, the ore is mined, ground to increase the contact area between the uranium values in the ore and the leach solution, usually less than about 14 mesh but in Some cases, such as limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a "pregnant" liquor solution (PLS), is produced through at least one production well penetrating the deposit. It is this latter in-situ leaching of subsurface formations to which the present invention is directed.

The most common aqueous leach solutions are either aqueous acidic solutions, such as sulfuric acid solutions, or aqueous alkaline solutions, such as sodium carbonate and/or bicarbonate.

Aqueous acidic solutions are normally quite effective in the extraction of uranium values. However, aqueous acidic solutions generally cannot be utilized to extract uranium values from ore or in-situ from deposits containing high concentrations of acid-consuming gentle, such as limestone. While some uranium in its hexavalent state is present in ores and subterranean deposits, the vast majority of the uranium is present in its valence states lower than the hexavalent state. For example, uranium minerals are generally present m the form of uraninite, a natural oxide of uranium in a variety of forms such as $UO_2$, $UO_3$, $UO.U_2O_3$ and mixed $U_3O_8$ ($UO_2.2UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2.3H_2O$, and uranites which are mineral phosphates of uranium with copper or calcium, for example, uranite lime having the general formula $CaO.2UO_3.P_2O_5.8H_2O$. Consequently, in order to extract uranium values from subsurface formations with aqueous acidic leach solutions, it is necessary to oxidize the lower valence states of uranium to the soluble, hexavalent slate.

Combinations of acids and oxidants which have been suggested by the prior art include nitric acid, hydrochloric acid or sulfuric acid, particularly sulfuric acid, in combination with air, oxygen, sodium chlorate, potassium permangante, hydrogen peroxide and magnesium perchlorate and dioxide, as oxidants. However, the present invention is directed to the use of sulfuric acid leach solutions containing appropriate oxidants and other additives, such as catalysts.

There are two commonly used methods for the recovery of uranium from pregnant liquor solution (PLS). One technique, solvent extraction, employs the use of a non aqueous solvent to selectively extract uranium from the PLS.

The second method involves ion exchange technology. Strong and weak base anion exchange resins are commonly used. This ion exchange method has become the more preferred method of uranium recovery in various regions of the world because of its environmental benefits as well as its safety benefits. Flammable toxic solvents need not be used for the present method as compared to the solvent extraction method where harmful chemicals are employed.

Additionally it has been discovered that in environments where there is a relatively high concentration of chloride, i.e. greater than 5 g/L, based on the composition of the PLS fouling of the ion exchange resin occurs. This fouling results in a decreased loading capacity of the resin. U.S. Pat. No. 4,599,221 uses an amino phosphonic functionalized resin to recover uranium from phosphoric acid; however a need exists for a method to recover uranium from acid leach in high chloride environments. Recovery of uranium from phosphoric acid is a different process from the acid leach process because there are competing ions, such as chloride, in and acid leach solution that can foul any recovery media. The phosphoric acid process does not have such. Additionally, the levels of uranium in a phosphoric acid process are relatively low, i.e. less than 300 ppm. In acid leach, the batting capacity of uranium must be much greater as the levels of uranium in acid leach liquors can be present in up to 2000 mg/L (or ppm)

It is known that for the same concentration of U in the PLS, the operating capacity is much greater in acid leach liquor than in phosphoric acid liquor. Therefore one of skill in the art would not typically apply the same techniques from the recovery of metals from phosphoric acid to acid leach.

The present invention solves these problems of the art by proving an amino phosphonic functionalized resin useful for the recovery of uranium that does not foul in chloride environments of greater than 5 g/L.

The present invention provides a method for the recovery of uranium from a pregnant liquor solution comprising:

i) providing an amino phosphonic functionalized resin;

ii) providing a pregnant liquor solution comprising chloride and uranium;

iii) passing the pregnant liquor solution over the amino phosphonic functionalized resin to separate the uranium from the pregnant liquor solution; and iv) eluting the uranium wherein the chloride is present in an amount from 5 to 80 g/L.

Figure 2:
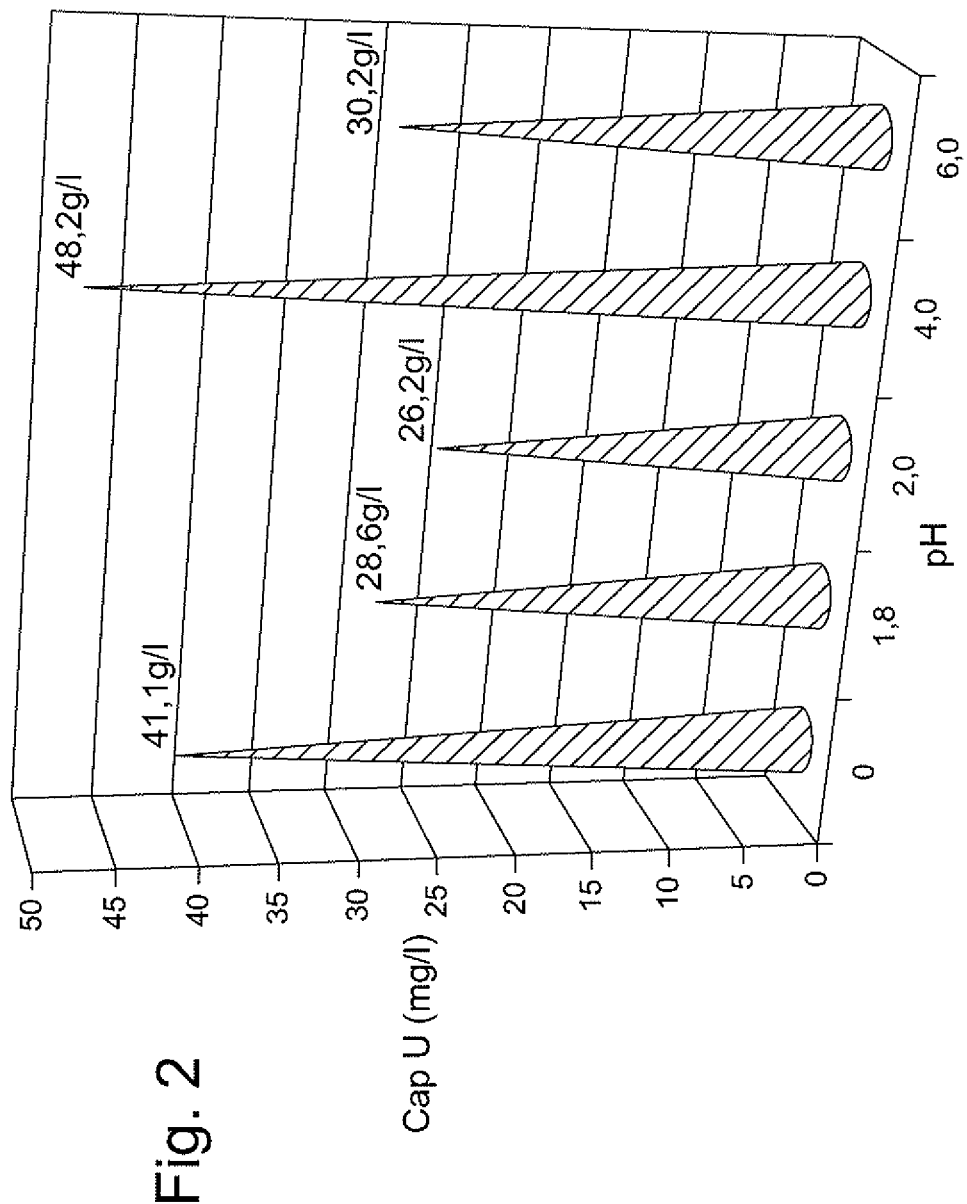

FIG. 1 shows a graph of the results of dynamic loading versus flow rate in the Example; and FIG. 2 shows a graph of the results of uranium concentration versus pH in the Example.

As used herein the term amino phosphonic functionalized resin is meant to include either an amino phosphonic resin or an amino hydrophosphonic functionalized resins.

In the present invention the resin is a styrene polymer resin having active amino phosphonic functional groups linked to the polymer matrix. The term "styrene polymer" indicates a copolymer polymerized from a vinyl monomer or mixture of vinyl monomers containing styrene monomer and/or at least one crosslinker, wherein the combined weight of styrene and cross linkers is at least 50 weight percent of the total monomer weight. The level of cross linking ranges from 4 to 10%. All percentages herein are weight percentages.

A crosslinker is a monomer containing at least two polymerizable carbon-carbon double bonds, including, e.g., divinylaromatic compounds, di- and tri-(meth)acrylate compounds and divinyl ether compounds. Preferably, the crosslinker(s) is a divinylaromatic crosslinker, e.g., divinylbenzene.

The structure of the polymer can be either gel or macroporous (macroreticular). The term "gel" or "gellular" resin applies to a resin which was synthesized from a very low porosity (0 to 0.1 cm$^3$/g), small average pore size (0 to 17 Å) and low B.E.T. surface area (0 to 10 m$^2$/g) copolymer. The term "macroreticular" (or MR) resin is applied to a resin which is synthesized from a high mesoporous copolymer with higher surface area than the gel resins. The total porosity of the MR resins is between 0.1 and 0.7 cm$^3$/g, average pore size between 17 and 500 Å and B.E.T. surface area between 10 and 200 m$^2$/g. The resin is in acid form.

The resin is used to treat an acid leach pregnant liquor solution (PLS). The PLS of the present invention comprises uranium and chloride. Uranium is primarily present in the form of $U_3O_8$; although other commonly known forms and isotopes of uranium may be present.

As used herein, the term uranium refers to all forms and isotopes of uranium. Uranium is present in the PLS in an amount from 25 to 2000 mg/L, preferably from 50 to 1500 mg/L, and further preferably from 100 to 1000 mg/L. Chloride ion and chloride complexes together as "chloride" is present in the PLS in an amount from 5 to 80 g/L and preferably form 7 to 70 g/L and further preferably from 15 to 50 g/L. The PLS of the present invention may optionally contain a variety of other components. Such include but are not limited to: iron, sulfuric acid, sodium, calcium, potassium, copper, phosphorus, and aluminum. The pH of the PLS is acidic and ranges from 0 to 4. Furthermore, the PLS may be obtained from any method commonly known to those of skill in the art including but not limited to in situ leach, heap, leach, resin in pulp, and in situ recovery.

Uranium is separated from the PLS by passing the PLS over the amino phosphonic functionalized resin. Techniques commonly used in the art to separate the uranium from the PLS may be applied. Such techniques include but are not limited to fixed bed, co-current or countercurrent fluidized bed. The process may be batch or continuous. Typically the flow rate within the column or packed bed system is from 0.5 to 50 BV/h, preferably 1 to 50 BV/h, more preferably 2 to 45 BV/h.

The amino phosphonic functionalized resin retains the uranium from the PLS and the uranium is then recovered by elution. Methods of elution used by those of ordinary skill in the art are used herein. In one instance, for example, the uranium loaded resin may be treated with a solution of ammonia or ammonia hydroxide. Afterwards, the resin is eluted with a solution of sodium carbonate. The uranium is then recovered from solution by known separations techniques, such as for example precipitation. It is beneficially found that the at least 10% of the uranium found in the original PLS may be recovered. Within the pH range of 0 to 4 of the PLS, uranium recovery levels of up to 25% may be achieved.

EXAMPLES

Laboratory Equipment Used

Jacketed glass column (height 30 cm, Ø 2-3 cm, fitted with sintered glass of porosity 1). Peristaltic pump with flexible tubings 10, 100 graduated cylinder. 25 mL plastic flasks for samples collections. Stopwatch. Appropriate equipment for Uranium analysis (I.e: ICP). Standard laboratory glassware Resin Used AMBERLITE™ IRC 747, is a registered trademark of Rohm and Haas Company, a wholly owned subsidiary of The Dow Chemical Company. The resin is in sodium form having a polystyrenic matrix, crosslinked with divinyl benzene and containing aminophosphonic functional groups.

Note

The resin was converted in its appropriate ionic form (i.e: acidic form) before carrying out the experiments.

Example

Experiment 1: A solution containing 200 mg/L of uranium (expressed as U), 24 g/L of sulfate, 0 g/L of chloride 2 g/L of iron (as $Fe^{3+}$) was passed through AMBERLITE IRC 747 at 5 BV/h.

Experiment 2: A solution containing 200 mg/L of uranium (expressed as U), 24 g/L of sulfate, 20 g/L of chloride 2 g/L of iron (as $Fe^{3+}$) was passed through AMBERLITE IRC 747 at 5 BV/h.

Experiment 3: A solution containing 200 mg/L of uranium (expressed as U), 24 g/L of sulfate, 0 g/L of chloride 2 g/L of iron (as $Fe^{3+}$) was passed through AMBERLITE IRC 747 at 2.5 BV/h.

Experiment 4: A solution containing 200 mg/L of uranium (expressed as U), 24 g/L of sulfate, 20 g/L of chloride 2 g/L of iron (as $Fe^{3+}$) was passed through AMBERLITE IRC 747 at 2.5 BV/h.

All experiments were carried out at 25° C. A sample was taken every 10 bed volumes for uranium analysis. The leakage curves were obtained as shown in FIG. 1.

FIG. 1 shows that the resin loading is not affected when the chloride concentration increases from 0 to 20 g/L.

The uranium loading increases when the flow rate decreases. The operating capacity is around 15 g/LR (expressed as U) at a flow rate equates to 5 BV/h and around 21 g/LR (expressed as U—g/LR stands for "gram per liter of resin in its ionic form considered"—i.e: acidic form) when the flow rate equates 2.5 BV/h.

Elution

The loaded resins were treated with 2 bed volumes of a solution of ammonia hydroxide at a concentration of 1 mol/L (1N). Afterwards, the resins were eluted with a solution of sodium carbonate at a concentration of 1 N.

The totality of uranium loaded was eluted within 7 bed volumes of sodium carbonate solution.

Experiment 5: Several solutions containing 200 mg/L of uranium (expressed as U), 24 g/L of sulfate, 0 g/L of chloride were prepared. Each solution was adjusted a different pH level. A sample of resin was put in contact with each solution. The ratio of 1 part resin to 50 parts of solution was kept constant in order to avoid any external perturbation. After shaking for 8 hours, the analysis of the uranium residual in the supernatant was analyzed and the resin loading determined. FIG. 2 indicates that the optimum loading is obtained when the pH equates 4. Above pH 4, precipitation of Uranium was observed. It was also observed that the loading was very good at pH 0. The results are shown in FIG. 2.

What is claimed is:

1. A method for the recovery of uranium from a pregnant liquor solution comprising:
    i) providing an amino phosphonic functionalized resin in acid form;
    ii) providing a pregnant liquor solution comprising chloride and uranium;
    iii) passing the pregnant liquor solution over the amino phosphonic functionalized resin to separate the uranium from the pregnant liquor solution; and
    iv) eluting the uranium
    wherein the chloride is present in an amount from 5 to 80 g/L, and
    wherine the pregnant liquor solution has a pH of from 0 to 4.

2. The method of claim 1 wherein the pregnant liquor solution comprises from 25 to 2000 mg/L uranium.

3. The method of claim 1 wherein the pregnant liquor solution comprises from 7 to 70 g/L chloride.

4. The method of claim 1 further wherein at least 10% of the amount of uranium from the pregnant liquor solution is recovered.

5. The method of claim 1 further wherein up to 25% of the amount of uranium from the pregnant liquor solution is recovered.

* * * * *